July 2, 1935.  R. G. ROBERTS  2,007,004
SPREADER FOR APPLYING COATING MATERIAL TO PIPES
Filed Nov. 9, 1931
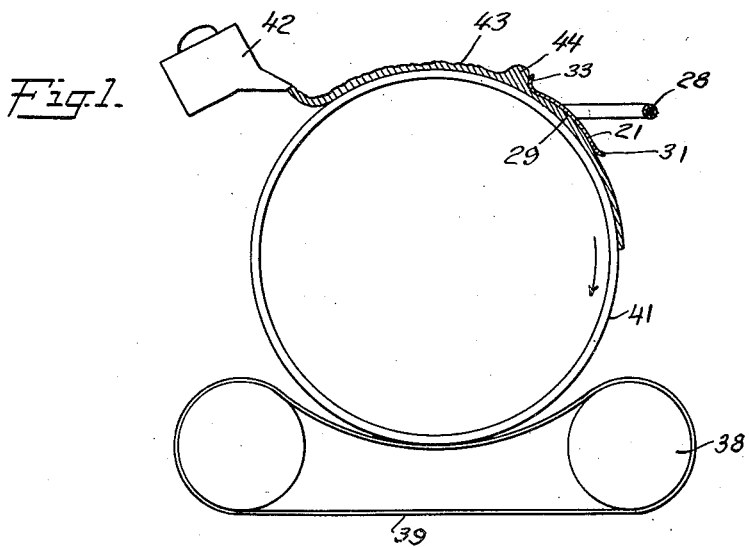
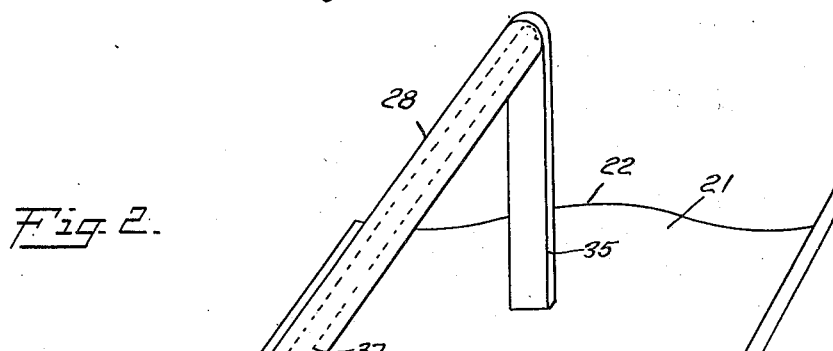
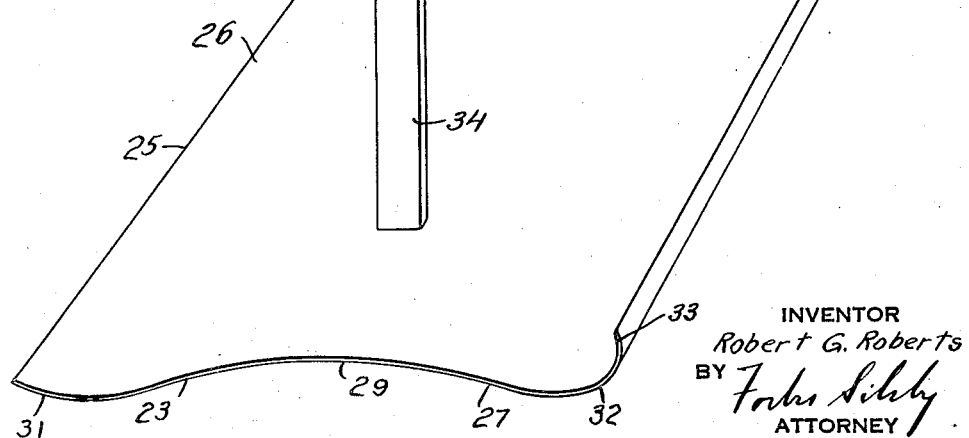
INVENTOR
Robert G. Roberts
BY
ATTORNEY Patented July 2, 1935

2,007,004

UNITED STATES PATENT OFFICE 2,007,004

SPREADER FOR APPLYING COATING MATERIAL TO PIPES

Robert Gregory Roberts, Kansas City, Mo., assignor to The Barrett Company, New York, N. Y., a corporation of New Jersey Application November 9, 1931, Serial No. 573,879

7 Claims. (Cl. 72—136)

This invention relates to a spreading pad and more particularly to a trowel for spreading bituminous coatings or enamels over the exterior surface of a pipe which is being rotated.

It is an object of this invention to provide a trowel or spreading pad of novel shape whereby the application of protective coatings of material to pipes is facilitated.

It is a further object of this invention to provide a trowel or smoothing pad of heat-conducting material such as metal adapted for use in the application of protective coatings to rotating pipes whereby the flow of coating material to the trowel may be kept in view at all times thereby enabling the coating material to be properly applied and reducing the waste of coating material to a minimum. I have found that use of a heat conducting trowel as distinguished from the non-heat conducting pads heretofore employed results in more rapid cooling of the hot coating applied to pipes with the consequent result that the coated pipe upon leaving the trowel has the coating firmly adhering thereto, and flow of the coating medium after it leaves the area of the pipe under the trowel does not take place.

It is desirable when laying conduits or large pipes in the field to coat such pipes with suitable materials such as bituminous substances to retard the corrosion of such pipes by the earth and increase the length of their period of service. A portable rig is usually provided for rotating the pipe while the protective coating is being applied to the exterior thereof, the coating being applied in the form of a viscous mass and at relatively high temperatures. The applied material is smoothed over the exterior of the pipe to form a film of uniform thickness which subsequently hardens to form a hard impervious coating to protect the surface of the pipe against corrosion.

Heretofore it has been the practice to smooth the applied material over the exterior of the surface of the pipe by the manipulation of a flexible pad or sheet usually of some material of a heat-insulating fibrous character such as asbestos. Such sheets are semi-flexible and must be held in place against the pipe by pressure of the hand of the operator against the rear of the sheet. Since the shape of the hand necessarily precludes the application of uniform pressure to all portions of the surface of the pad, an uneven layer of material often results necessitating an additional application of material at the thinner portions of the layer and a hand manipulation to evenly distribute the material applied. Moreover, the nature of the material, i. e. heat-insulating, precludes a transfer of heat and a consequent lowering of the temperature of the surfacing material while under the manipulation of the pad. Since the surfacing material entering the space beneath the pad is at such a temperature that it is viscous and plastic in order to permit of its uniform distribution and spreading, by reason of the heat insulating qualities of the smoothing pad, it will leave the area of the pipe surface covered by the pad at substantially the same temperature and in substantially the same condition so that it is soft and plastic and may flow from one spot to another, thereby often times undoing the work of the pad in forming the uniform layer. Furthermore, smoothing pads of the above-described fibrous type are subject to wear and must be replaced from time to time to maintain the required smooth undersurface necessary to obtain a uniform coating of material upon the exterior of the pipe.

My invention relates to a means by which the above disadvantages are overcome and involves the application of coating material in a viscous, plastic state to a rotating pipe and the smoothing thereon of the coating to form a protective film of uniform thickness by the use of a novel form of trowel formed of heat conducting material and provided with a smooth undersurface, the main central portion of which is concave in complemental relation to the surface of the pipe and the end portions of which are provided with upturned convex portions of different degrees of convexity, the end portion with the greater degree of convexity being adapted to receive the plastic coating material and permit the plastic material to accumulate thereon so that it is readily visible by the operator, the main concave portion being adapted to shape it and the other end being adapted to afford means by which the film of coating material is gradually released from the pressure of the trowel to maintain the smooth surface intact.

Other objects and advantages of my invention will appear from the following detailed description taken in connection with the accompanying drawing in which:

Fig. 1 is a diagrammatic view taken on a section of a rotating pipe and supporting means therefor illustrating the preferred manner of employing the trowel of my invention, and Fig. 2 is a perspective view of the preferred embodiment of the trowel of my invention.

As shown in Fig. 2, the preferred embodiment of the trowel of my invention consists of a main body portion 21, preferably of substantially rectangular shape defined by sides 22 and 23 and edges 24 and 25, and a handle portion 28. The main body portion 21 is preferably formed from any suitable heat-conducting material such as metal and is shaped to provide an upper face 26 and a lower face 27. The upper face 26 of the trowel need not be finished in any respect beyond the initial shaping step but the lower face 27 which is exposed to the coating material is preferably finished with a comparatively smooth surface to impart a smooth face to the layer of coating material with which it contacts.

The lower face 27 of the trowel 21 is formed as shown in Fig. 2 with a series of alternately disposed convex and concave portions, the main portion of the face 27 being provided with a concave section 29 and the edge portions thereof being shaped to form convex portions 31 and 32. An upturned flange portion or toe 33 is provided along the edge 24 for a purpose to be later described and constitutes an extension of the convex portion 32. The concave portion 29 is preferably shaped as a segment of an arc of a circle, the radius of which is equal to the radius of a circle defined by the outer face of the protective coating layer applied to the exterior of the pipe. The convex portion or heel 31 of the trowel is preferably formed as an arc of the circle of the same size but the degree of convexity thereof may be varied within wide limits since the heel is designed to afford a gradual receding of the contact of the trowel with the layer of coating material.

The convex portion 32 and the toe 33 are formed with a greater degree of convexity than the portions 29 and 31 and are adapted to serve as equalizing or distributing elements to insure an equal and sufficient supply of coating material to all portions of the surface of the pipe under the trowel 21.

Means is provided for handling the trowel 21 and holding it in position against the layer of coating material on the pipe in the form of handle 28 which consists of two upright members 34 and 35 connected at their upper extremities by a connecting member 36 on which is mounted a suitable grip member 37, preferably formed of material which does not conduct heat such as wood. The uprights 34 and 35 may be fastened to the main body portion 21 of the trowel by riveting, welding or any other suitable means. While I have shown the handle 28 in Fig. 2 as mounted at right angles to the main body portion 21 of the trowel, it is to be noted that the handle may be mounted at any suitable angle, preferably being mounted at an angle of 45° with the rear portion 31 of the trowel as shown in Fig. 1. The connection of the handle to the body portion of the trowel may be adjustable so that the handle may be positioned at various angles as desired. I have found that the 45° position of the handle with reference to the body portion 21 of the trowel is productive of the best results in coating the pipe since the pressure brought to bear upon the handle by the workman is equally divided between the surface of the coating material under the concave portion 29 of the trowel 21 and the toe 33 of the trowel which functions to build up a supply of coating material to the undersurface of the trowel and resists the passage of large masses of coating material which are broken up and evenly distributed along the edge 24 of the trowel. Thus the workman is able to maintain the trowel in an operative position on the pipe near the top thereof to one side of the vertical diameter with the least amount of effort.

In the process of applying a coat or layer of protective material to a pipe wherein my novel form of trowel is employed, an apparatus similar to that diagrammatically illustrated in Fig. 1 may be employed. Such a device usually comprises a series of pairs of spaced rollers 38 disposed longitudinally of a pipe 41. The pipe 41 may rest directly upon the rollers 38 or it may be supported on the upper run of a belt 39 which is adapted to travel around the rollers 38. Any suitable means may be provided for rotating the rolls 38 which in turn cause the pipe 41 to rotate in a clockwise direction as shown by the arrow in Fig. 1.

Coating material such as asphalt, pitch or enamel, preferably a mica pitch composition such as disclosed and claimed in United States Patent No. 1,773,131, granted August 19, 1930, is poured upon the exterior surface of the rotating pipe from a container 42 as shown, by an operator on one side of the pipe. The material at this point is of a viscous, plastic nature due to its relatively high temperature and gradually cools to a more viscous irregular mass as shown at 43 as the pipe is rotated. The trowel 21 is held in a position closely adjacent the exterior surface of the pipe by means of the handle 28 by an operator on the other side of the pipe. As the irregular mass 43 of coating material meets the toe 33 of the trowel, the irregular formations thereof are broken up and evenly distributed over the width of the toe. The toe 33 by reason of its convex formation permits a uniform layer of the coating material to pass thereunder, the thickness of the layer of coating material being readily controlled by varying the pressure applied upon the handle 28 of the trowel 21, i. e., as more pressure is applied, the toe 33 offers more resistance to the flow of the coating material and consequently a less amount of the coating material is allowed to pass. As the pressure upon the handle is decreased, a correspondingly thicker layer of coating material will be allowed to pass by the toe 33.

The layer of coating material passes from the toe 33 to the concave section 29 of the trowel 21 which as has been previously explained is of the correct degree of curvature for the protective layer of coating. During its passage beneath the section 29, by reason of the pressure applied through the handle 28, the material is formed into a homogeneous uniform layer which bonds with the pipe surface. During its travel under the heat conducting trowel 21, the material is rapidly cooled, by reason of the transfer of heat through the metal trowel, until it is practically in a solid phase as it passes from beneath the trowel. The trowel is heated by the coating material and such heat, by reason of the heat conducting properties of the trowel is communicated to all portions of the trowel, thereby transferring heat from hotter portions of the material to cooler portions thereof beneath the trowel to effect a temperature adjustment and equalization and to produce a more homogeneous and uniform layer.

As the layer of coating material passes from beneath the trowel 21, it is not abruptly released from the pressure of the trowel but is gradually released by the convex heel 31. Thus the heel 31 functions to effect an "annealing" operation on the layer of coating material with the exception that the operation is one involving pressure and not temperature with respect to which the term "annealing" is more properly applicable.

The operators walk along opposite sides of the pipe at a rate proportional to the application of the coating material to the pipe surface to apply a firm, even coating of the material to the entire circumferential surface of the pipe being rotated.

From the above description, it is apparent that my device is possessed of many advantages.

By the employment of the form of trowel composed of a heat conducting material and of the unique shape herein described, a homogeneous and uniform layer of a protective coating material may be applied to a pipe with the elimination of waste of material.

The point of application of the pressure of the operator against the trowel permits of an equal distribution the pressure between the formation of the layer of coating material and the finishing thereof, thereby forming an efficient protective layer in a minimum amount of time and with a minimum number of operations.

Application of mica pitch compositions to pipes in accordance with my invention, it has been found, results in the formation of a smooth uniform enamel-like coated surface which efficiently protects the pipe against weathering influences, the destructive effects of ground currents, and the corrosive action of the soil when the pipe is laid underground.

While I have shown my invention in connection with a single application of material to a pipe, it is to be understood that it is capable of use in the application of several superposed layers.

I claim:

1. In an apparatus for coating a rotating pipe with hot coating material, means for spreading said material upon the pipe surface and forming a layer of uniform thickness comprising a trowel, said trowel being formed of heat conducting metal whereby the temperature of the hot coating material in contact therewith is rapidly lowered, said trowel being provided with means to build up and distribute an even layer of material to the surface of the pipe beneath said trowel and means for forming a layer of material conforming to the curvature of the pipe surface.

2. In an apparatus for coating a rotating pipe with a viscous coating material at relatively high temperature, means for spreading said material upon the pipe surface and forming a layer of uniform thickness comprising a trowel, said trowel being provided with means to build up and distribute an even layer of material in a viscous state and at relatively high temperature to the surface of the pipe beneath said trowel and means for rapidly increasing the viscosity and lowering the temperature of the layer of coating material while forming it into a layer conforming to the degree of curvature of the pipe surface.

3. In an apparatus for coating a rotating pipe with coating material in a viscous and plastic state, means for distributing said material in a uniform layer over a predetermined portion of the surface of said pipe, means for rapidly increasing the viscosity and reducing the plasticity of said material and forming it under pressure into a layer of uniform thickness conforming to the degree of curvature of the surface of said pipe, said means having a curvature corresponding to the curvature of the surface of the coating material on the pipe, and means for gradually reducing said pressure.

4. In a trowel employed in the application of viscous materials at high temperatures to a rotating surved surface, a smooth surface of heat-conducting material adapted to be positioned adjacent the surface to be coated, said surface comprising a main portion shaped to conform to the coated surface, an end portion provided with an upwardly directed flange to evenly distribute the material to said main portion and a second end portion of the same shape as the main portion but in reversed relation thereto.

5. A trowel adapted for the application of viscous materials to a rotating surface comprising a handle portion and a body portion, the handle portion being arranged at an acute angle to said body portion, means in said body portion to build up and distribute a layer of viscous material to the rotating surface under said body portion, means to increase the viscosity of said material and shape it by pressure into a layer of uniform thickness conforming in shape to the shape of the rotating surface and means to gradually reduce said pressure.

6. A trowel for forming a layer of material of uniform thickness and predetermined curvature on a rotating curved surface comprising a body portion and a handle portion, the body portion of said trowel being constructed of heat-conducting material and formed in three sections, the first of said sections comprising a convex portion of relatively small radius and an upturned flange portion adapted to receive, store and distribute a quantity of the material applied, the second of said sections comprising a concave portion and a third section of convex shape adapted to gradually recede from the surface of the material, said handle portion being located at an angle of 45° with respect to said body portion.

7. In a trowel employed in the application of viscous materials at high temperatures to a curved surface, a smooth surface of heat-conducting material adapted to be positioned adjacent the surface to be coated, said surface comprising a main portion shaped to conform to the coated surface and an end portion provided with an upwardly directed flange so that the material accumulates on the flange and is visible to the operator as it flows therefrom to said main portion.

ROBERT GREGORY ROBERTS.